N. H. EDGERTON.
Apparatus for Producing Calcium-Light.
No. 169,244. Patented Oct. 26, 1875.
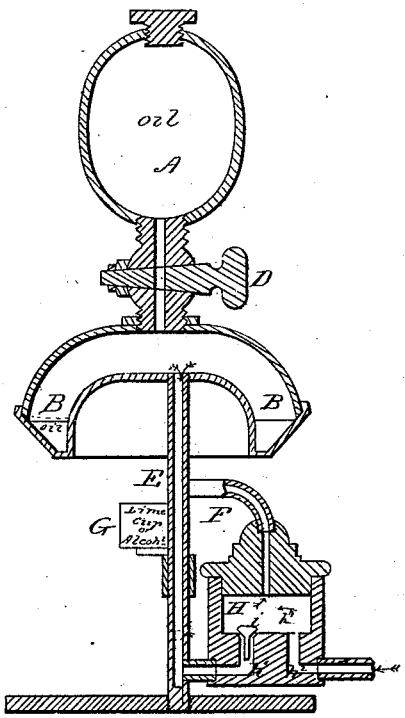

UNITED STATES PATENT OFFICE.

NATHAN H. EDGERTON, OF PHILADELPHIA, PENNSYLVANIA.

IMPROVEMENT IN APPARATUS FOR PRODUCING CALCIUM LIGHT.

Specification forming part of Letters Patent No. 169,244, dated October 26, 1875; application filed April 28, 1875.

*To all whom it may concern:*

Be it known that I, NATHAN H. EDGERTON, of Philadelphia, in the county of Philadelphia and State of Pennsylvania, have invented certain new and useful Improvements in Apparatus for Producing Calcium Light; and I do hereby declare the following to be a full, clear, and exact description of the invention, such as will enable others skilled in the art to which it pertains to make and use it, reference being had to the accompanying drawings, which form part of this specification, in which—

Figure 1 is a vertical central section of apparatus for the production of oxyhydrocarbon light.

This invention has for its object the production of heat and light from hydrocarbon oils and other suitable liquids, vaporized by the application of heat, their vapor mixed with oxygen, and burned in contact with lime; and it consists in the peculiar construction and combination of mechanical devices involved in the practice of said method or process.

My invention accordingly proposes the vaporization of a hydrocarbon oil or other liquid in a suitable retort or generator by the application of external heat, the admixture of the resultant hydrocarbon vapor with pure oxygen, the combustion of the mixed gas in contact with lime, and the consequent production of both light and heat of intense degree, the heat being utilized for the purpose of promoting the vaporization of the hydrocarbon.

Referring to the accompanying drawing, which represents the apparatus for generating vapor from hydrocarbon and applying it to the production of the oxyhydrocarbon light, A designates a reservoir to contain the oil. This reservoir may be of any desired capacity, but will be available for practical use within the dimensions of a few inches, the vapor being produced only accordingly as it is used. Below said reservoir is a generator, B, communicating therewith through a tube, C, provided with a cock, D, to regulate the flow of oil, which is to be supplied to the generator drop by drop, or in the form of a mere jet.

The generator is heated by externally-applied dry heat, and the vaporization of the hydrocarbon effected by the contact of the same with the bottom of the generator, said vaporization being instantaneous. From this generator the vapor passes downward through a tube, E, leading to the mixing chamber of the different gases, and is burned in combination with the oxygen, producing, when lime is used, the calcium light, and at the same time heating the generator, the burner F being located beneath the latter.

No other heating medium is required, except at the commencement of the operation, when it is necessary to start the vaporization by applying the heat of an alcohol flame, or by any other suitable means.

G designates the lime-cup, swiveled upon the pedestal of the generator, and available at the start, for the reception of sufficient burning-fluid to provide a temporary heat for the generator. H is the mixing chamber or bulb, into the space $h$ of which the hydrocarbon vapor and oxygen pass through separate vertical channels $h^1$ $h^2$. The channel $h^1$ has a check-valve, $i$, at its upper end, which only opens to the pressure of the hydrocarbon vapor, being adapted to close if the pressure of the oxygen at any time exceeds or equals that of the vapor, thus preventing the admission of oxygen to the generator and the occurrence of explosions.

A small supply of oil may, if desired, be kept in the generator, and the vaporization produced gradually instead of instantaneously.

The light produced by the above process I regard as an essentially novel substitute for the ordinary oxyhydrogen light. The process is entirely safe, and is obviously a decided improvement on the old method, involving the generation of hydrogen by chemical means, and the necessity of providing a large quantity in advance of its use. The light is very intense, and absolutely pure, being adapted to the most perfect spectrum analysis, while the flame is equal to or of greater heat than that produced by the ordinary process, promoting full combustion without any deposition of carbon.

Having described my invention, I claim—

In an apparatus for producing an oxyhydrocarbon light from the resultant vapors of hydrocarbon fluids mixed with oxygen and burned in contact with calcium, the combination, with the fluid-reservoir, vaporizing chamber or retort, oxyhydrocarbon-mixing chamber, and illuminating and vaporizing burner, of a tube for the supply of pure oxygen, a stop-cock to regulate the supply of hydrocarbon vapor, and a lime-cup, substantially as described and shown.

In testimony that I claim the foregoing I have hereunto set my hand this 20th day of April, 1875.

NATHAN H. EDGERTON.

Witnesses:
M. DANL. CONNOLLY,
CHAS. F. VAN HORN.